US008335733B1

(12) United States Patent
Altomare

(10) Patent No.: US 8,335,733 B1
(45) Date of Patent: Dec. 18, 2012

(54) INVESTMENT VEHICLE FOR SEPARATING A BASKET OF SECURITIES INTO A DEBT INSTRUMENT AND AN EQUITY COMPONENT

(75) Inventor: Gerald Altomare, Franklin Lakes, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1097 days.

(21) Appl. No.: 11/900,108

(22) Filed: Sep. 10, 2007
(Under 37 CFR 1.47)

(51) Int. Cl.
*G06Q 40/00* (2006.01)
(52) U.S. Cl. .................................. 705/36 R; 705/35
(58) Field of Classification Search ............ 705/36 R, 705/35, 37
See application file for complete search history.

(56) References Cited

U.S. PATENT DOCUMENTS

| 5,806,048 | A * | 9/1998 | Kiron et al. ............... 705/36 R |
| 2001/0056391 | A1 * | 12/2001 | Schultz ......................... 705/36 |
| 2003/0023544 | A1 * | 1/2003 | Chodes ......................... 705/38 |
| 2003/0074300 | A1 * | 4/2003 | Norris ........................... 705/37 |
| 2003/0225648 | A1 * | 12/2003 | Hylton .......................... 705/35 |
| 2005/0149421 | A1 * | 7/2005 | Marlowe-Noren et al. ..... 705/35 |

OTHER PUBLICATIONS

Funds of Funds is back, but only for people with big bucks. White, James A. Wall Street Journal. Apr. 11, 1989.*
Hedge-Fund managers hedging more as investors seek a conservative road. Bonte-friedheim, Robert. Wall Street Journal. Jun. 14, 1996.*
Banks dive into hedge funds. Leuchter, Miriam. U.S. Banker, Oct. 1998. p. 30.*

* cited by examiner

*Primary Examiner* — Kelly Campen
*Assistant Examiner* — John Preston
(74) *Attorney, Agent, or Firm* — Stephen C. Glazier; K&L Gates LLP

(57) ABSTRACT

Embodiments of a system and a method provide for efficiently leveraging equity interests in investment funds. In an embodiment, equity and zero-coupon debt are issued on an investment vehicle comprised of a static basket of equity interests in investment funds. An embodiment of the method of investing includes passively managing a static basket of equity interests in investment funds which actively manage investments in underlying funds. An embodiment of a method of lending includes purchasing zero-coupon debt secured by an investment vehicle comprised of a static basket of equity interests in investment funds.

58 Claims, 3 Drawing Sheets

INVESTMENT VEHICLE FOR SEPARATING A BASKET OF SECURITIES INTO A DEBT INSTRUMENT AND AN EQUITY COMPONENT

FIELD OF THE INVENTION

Embodiments of the invention generally relate to investment vehicles. Particular embodiments of the invention relate to methods for efficiently leveraging a static basket of investment funds by separating the investment vehicle into equity interests and zero-coupon debt securities.

BACKGROUND OF THE INVENTION

Investors pursue a wide variety of investment strategies in order to balance the level of risk they find acceptable with their desire to maximize their returns. Leveraging a portfolio has the potential to magnify growth, but can also magnify losses. One way to leverage a portfolio is by using a margin account. Margin accounts are monitored to ensure that the equity remains above the maintenance margin. If the value of the account drops below the maintenance margin, the investor can add money or securities to the account in order to raise the value of the equity above the maintenance margin. If the portfolio suddenly declines in value, the investor may need to liquidate some assets quickly in order to sustain the maintenance margin. Consequently, it is easier to respond to market fluctuations if the assets are liquid, such as publicly traded securities, than if the leveraged assets are illiquid, such as, for example, hedge funds.

Despite the complications inherent in leveraging investments in hedge funds, investors still desire to do so. Investors want to combine the potential for increased gains afforded by leveraging assets with the professional investment management provided by hedge funds. Collateralized Fund Obligations ("CFO") are one method which investors use to securitize investments in hedge funds. A CFO uses hedge funds as the collateral against which a variety of debt and equity securities are offered. Each of these securitizations has an asset manager who actively manages the dynamic asset allocation and makes coupon payments on the notes primarily through redemptions and liquidations.

A CFO, however, does not efficiently leverage the hedge funds. As a result of the illiquid nature of hedge funds, if the net asset value of the hedge funds drops, the investments cannot be liquidated quickly to increase the equity in the margin account. In order to decrease the likelihood of this happening, a higher maintenance margin must be maintained. Another disadvantage of CFOs is that some of the assets must be liquidated on a periodic basis in order to make the interest payments on the debt. As a result, the asset manager must regularly reassess the allocation of assets in order to determine which assets should be liquidated. This increases the management costs.

It remains challenging for investors to leverage investments in illiquid assets without experiencing the above-described disadvantages.

BRIEF DESCRIPTION OF THE DRAWINGS

Embodiments and other aspects of the invention will be readily apparent from the detailed description below and the appended drawings, which are meant to illustrate and not to limit the invention, and in which.

DETAILED DESCRIPTION OF EMBODIMENTS

The inventor has identified the need to create a new way to efficiently leverage investments in investment funds. The inventor has recognized the advantages of a passively managed investment vehicle comprised of a static basket of investments which are leveraged with debt securities on which no payments are made on until maturity.

It can be appreciated by those skilled in the art that embodiments of the invention described herein provide many benefits. The embodiments allow investors to efficiently leverage or lend against illiquid investment funds. The embodiments also allow investors to avail themselves of the potential for increased gains afforded by leveraging illiquid investments. The embodiments also allow investors to diminish the need to periodically liquidate assets in a leveraged portfolio to make interest payments on the debt securities.

In various embodiments, an investment vehicle is established comprising a static basket of equity interests in funds of securities. The investment vehicle can be, for example, a limited liability company that offers equity interests (hereinafter "equity") and zero-coupon debt securities (hereinafter "debt"), each backed by the static basket of equity interests. For example, an investment vehicle may issue $1 billion face amount of investment grade, zero-coupon notes and $275 million of equity. The notes may consist of, for example, one class of zero-coupon notes bearing a five-year term and a "AAA" rating. If the notes possess a semi-annual compound interest rate of 6.2%, for example, then the offering price of $1 billion face amount notes with a five-year term will be approximately $735 million. The investment vehicle will initially invest approximately $1 billion—the capital raised from both the debt and equity. It can be appreciated that using collateral worth $1 billion to secure $1 billion face value, zero-coupon debt that does not mature for five years will result in a high investment rating.

Figure 1:
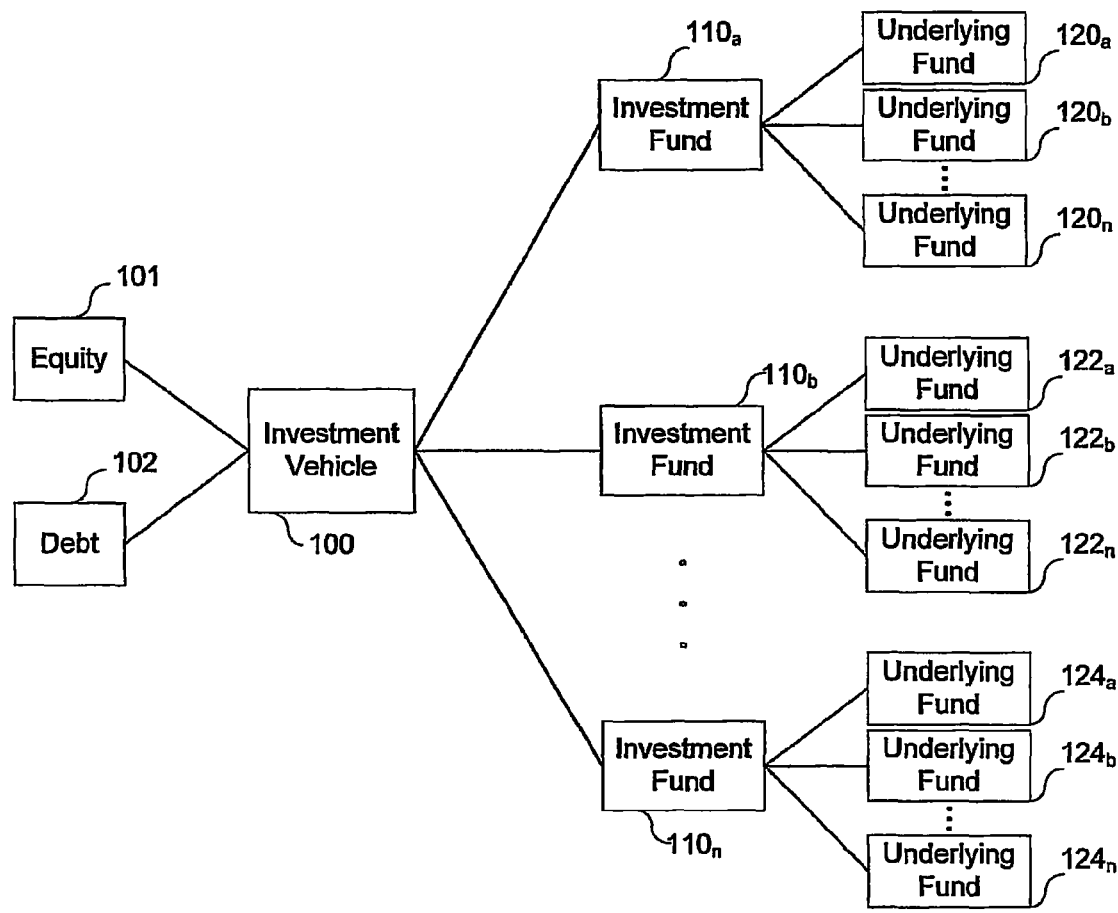
FIG. 1 shows an example of an investment vehicle according to various embodiments of the invention.
Figure 2:
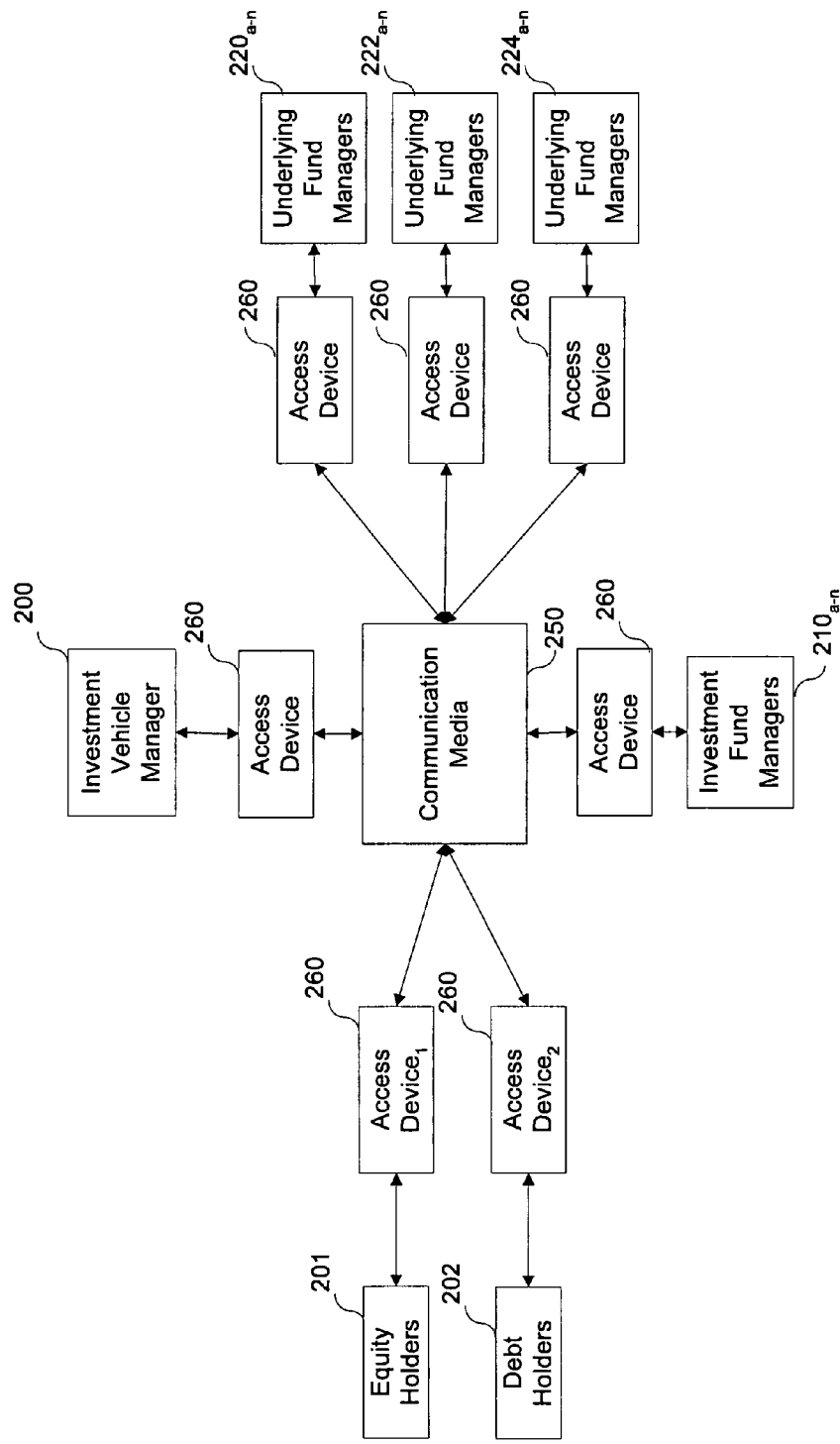
FIG. 2 shows an example of a system according to embodiments of the invention.

With reference to FIGS. 1 and 2, configuration and system examples of various embodiments of the invention are illustrated. In various embodiments, investment vehicle 100 may be, for example, a limited liability company. Investment vehicle 100 may also be a special purpose, bankruptcy remote entity. The management of investment vehicle 100 and its assets may be overseen by investment vehicle manager 200. In various embodiments, investment vehicle manager 200 may be the managing member of investment vehicle 100.

In various embodiments, debt 102 may be comprised of one class of debt securities issued by investment vehicle manager 200 to debt holders 202 and secured by investment vehicle's 100 assets. In various embodiments, debt 102 is structured so that no payments, of either interest or principal, are required between the initial closing date of investment vehicle 100 and the maturity date of debt 102. Furthermore, debt 102 may be structured such that debt holders 202 do not have the right to accelerate payment. Debt 102 may be, for example, investment grade, zero-coupon notes with a five-year term. In various embodiments, debt holders 202 may be any type of investor such as, for example, an individual, a corporation, or an institutional investor.

In various embodiments, equity 101 may include equity interests issued by investment vehicle manager 200 to equity holders 201. Ownership of equity 101 gives equity holders 201 a claim to all of investment vehicle's 100 assets which remain after debt holders 202 are paid the face amount of debt 102 at the expiration of investment vehicle's 100 term.

In various embodiments, equity holders 201 and debt holders 202 may be accredited investors, as defined in Regulation D of the Securities Act of 1933; qualified purchasers, as defined in the Investment Company Act of 1940; and qualified institutional buyers, as defined in Rule 144A of the Securities Act of 1933. Limiting equity holders 201 and debt holders 202 allows investment vehicle 100 to invest in hedge funds. In various embodiments, debt holders 202 may not transfer, pledge or otherwise encumber the debt 102 except in compliance with Rule 144A.

In various embodiments, investment funds $110_{a-n}$ may be, for example, hedge funds, mutual funds, or a combination thereof. The management of each investment fund $110_{a-n}$ may be overseen, respectively by investment fund manager $210_{a-n}$. Each of investment funds $110_{a-n}$ may invest in one or more of underlying funds $120_{a-n}$, $122_{a-n}$, $124_{a-n}$. In various embodiments, investment fund managers $210_{a-n}$ may actively manage investment funds' $110_{a-n}$ allocation of assets among underlying funds $120_{a-n}$, $122_{a-n}$, $124_{a-n}$.

In various embodiments, underlying funds $120_{a-n}$, $122_{a-n}$, $124_{a-n}$ may be, for example, hedge funds, mutual funds, or a combination thereof. The management of each of underlying funds $120_{a-n}$, $122_{a-n}$, $124_{a-n}$ may be overseen, respectively, by the underlying fund managers $220_{a-n}$, $222_{a-n}$, $224_{a-n}$. Each of underlying funds $120_{a-n}$, $122_{a-n}$, $124_{a-n}$ may invest in any type of securities including, for example, stocks, bonds, hedge funds, mutual funds, or any combination thereof. Underlying fund managers $220_{a-n}$, $222_{a-n}$, $224_{a-n}$ may actively manage the allocation of assets among various investments.

Active management may include, for example, periodic reallocation of assets, reassessment of the investment strategy, and/or participation in the management, control or operation of funds or securities in which each investment fund $110_{a-n}$ or underlying fund $120_{a-n}$, $122_{a-n}$, $124_{a-n}$ is invested. Active management may also include acting on subjective evaluations and analysis in the selection, structuring, monitoring and disposition of investments based on performance, investment strategy, financial information, and/or other economic data.

It can be appreciated that there may be multiple levels of professional managers actively managing the investments of each underlying fund $120_{a-n}$, $122_{a-n}$, $124_{a-n}$. More levels of active management would increase the management costs while probably only marginally increasing investment vehicle's 100 returns. Passive management, however, can help to reduce the management costs associated with investment vehicle 100 to a fraction of the costs associated with active management.

Furthermore, investment vehicle 100 is appealing to investment fund managers $210_{a-n}$ and underlying fund managers $220_{a-n}$, $222_{a-n}$, $224_{a-n}$, because any investment received from investment vehicle 100 is committed for the term of debt 102. While most investors reevaluate their investments periodically, an investment received from investment vehicle 100 will not be withdrawn based on short term fluctuations in the net asset value of one more of investment funds $110_{a-n}$ or underlying funds $120_{a-n}$, $122_{a-n}$, $124_{a-n}$, to make coupon payments, to reallocate investments, and/or as the result of a reevaluation of the investment strategy being employed. In addition, investment vehicle 100 is also appealing to investors because, after the initial investment is made, investment vehicle manager 200 will not analyze the investment strategy implemented by investment funds $110_{a-n}$ or underlying funds $120_{a-n}$, $122_{a-n}$, $124_{a-n}$ or expect explanations for short term fluctuations in the net asset value. It can be appreciated that, unlike most investors, investment vehicle manager 200 will take up little or none of any of investment fund managers' $210_{a-n}$ or underlying fund managers' $220_{a-n}$, $222_{a-n}$, $224_{a-n}$ time or attention with, for example, phone calls and questions regarding reports or investment strategy. As a result, investment vehicle manager 200 should be able to negotiate lower fees from investment funds $110_{a-n}$.

In various embodiments, investment vehicle 100 can be operatively associated with communication media 250 that allow investment vehicle manager 200, equity holders 201, debt holders 202, investment fund managers $210_{a-n}$, and underlying fund managers $220_{a-n}$, $222_{a-n}$, $224_{a-n}$ to communicate with each other using access devices 260. Examples of access devices 260 include, without limitation, computer systems (e.g., notebooks), phones (e.g., wireless phones), fax, and personal data assistants (PDAs). Examples of communication media 250 include, without limitation, wireless networks, wireline networks, and/or a variety of networked media (e.g., intranets or the Internet).

In various embodiments, access devices 260 can be configured to allow investment vehicle manager 200, equity holders 201, debt holders 202, investment fund managers $210_{a-n}$, and underlying fund managers $220_{a-n}$, $222_{a-n}$, $224_{a-n}$ to communicate with each other using, for example, one or more of a web-based graphical user interface, e-mail messages, text messages, telephone calls, and/or faxes. For example, a investment fund manager 200 may employ a PDA as his access device 260 and request the net asset value of underlying fund $122_b$ from underlying fund manager $222_b$ by sending an e-mail.

In various embodiments, one or more computers may be used to keep the books and records that may be necessary or convenient, and to issue reports, periodically or occasionally, for the management or monitoring of the same. For example, a database may be maintained to track the net asset value of each investor account, investment fund $110_{a-n}$, and/or underlying fund $120_{a-n}$, $122_{a-n}$, $124_{a-n}$.

Figure 3:
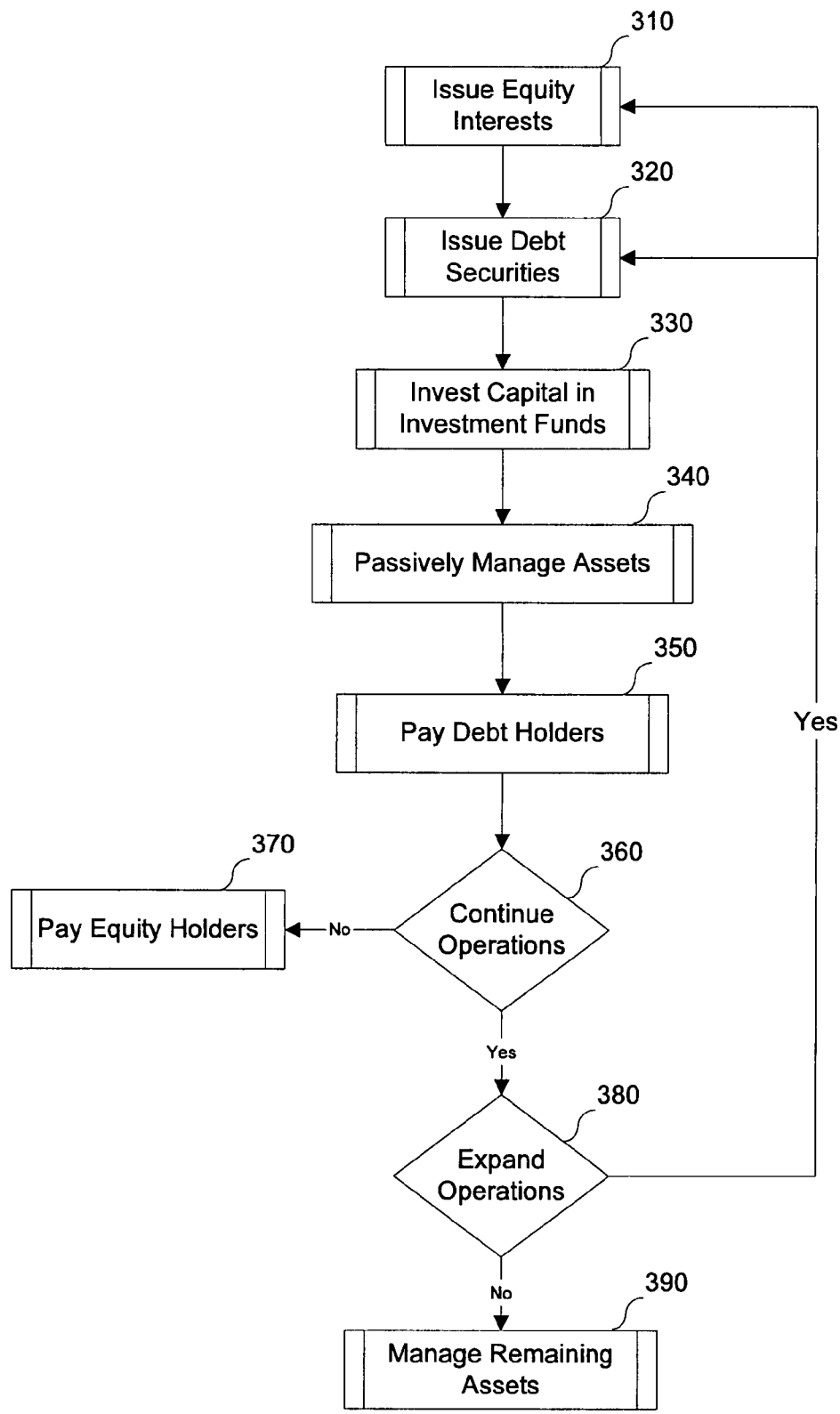
FIG. 3 shows a flow chart illustrating an example of a method for managing assets in an investment vehicle according to various embodiments of the invention.

With reference to FIG. 3, an example of the process flow of various embodiments is illustrated. At steps 310 and 320, investment fund manager 200 issues equity 101 and debt 102 to equity holders 201 and debt holders 202. In various embodiments, in order to facilitate the initial setup of investment vehicle 100, investment vehicle 100 may be the initial equity holder 201 of all or part of equity 101. In various embodiments, each of equity holders 201 may transfer all or part of equity 101, write options thereon, and/or enter into structured transactions based upon or with reference to equity 101.

At step 330, prior to the initial closing date of investment vehicle 100, the investment vehicle manager 200 may select and purchase the equity interests in one or more investment funds $110_{a-n}$. In various embodiments, investment vehicle manager 200 may invest in any type, or combination of types, of investment funds $110_{a-n}$ such as, for example, all hedge funds, all mutual funds, or a combination thereof. Investment vehicle manager 200 may consider a number of criteria in selecting investment funds $110_{a-n}$ including, for example, selecting investment funds $110_{a-n}$ that implement diverse strategies; selecting investment funds $110_{a-n}$ that implement similar strategies; selecting investment funds $110_{a-n}$ that concentrate their investments in different industries; or selecting investment funds $110_{a-n}$ based solely on past performance.

The investment vehicle manager 200 initially purchases equity 101 interests in one or more investment funds $110_{a-n}$ on behalf of investment vehicle 100. After the initial closing date, the basket of equity interests remains static for the term of investment vehicle 100 and investment vehicle manager 200 does not actively manage investment vehicle 100. It can be appreciated that the debt 102 and equity, issued in steps 310 and 320, are both backed by the static basket of equity interests.

It can be appreciated that, once the initial investments are made, a static basket of equity interests does not need to be actively managed. A static basket of equity interests can be passively managed because the allocation of assets among investment funds $110_{a\text{-}n}$ does not need to be periodically reevaluated. Furthermore, investments backed by long-term debt 102 that does not require interest payments can also be passively managed because it is unnecessary to periodically select the optimal assets to liquidate.

At step 340, after the initial closing date, investment vehicle 100 is passively managed until the expiration of the term of investment vehicle 100. In various embodiments, passive managers may monitor investment funds $110_{a\text{-}n}$ and underlying funds $120_{a\text{-}n}$, $122_{a\text{-}n}$, $124_{a\text{-}n}$ without having the right to participate in the management, control or operation of investment funds $110_{a\text{-}n}$ or underlying funds $120_{a\text{-}n}$, $122_{a\text{-}n}$, $124_{a\text{-}n}$, or to remove the managers thereof. Passive managers may not act on subjective evaluations of a fund's selection, structuring, monitoring and disposition of its investments based on, for example, fund performance, investment strategy, financial information, and/or other economic data.

In various embodiments, passive management may include monitoring investment funds $110_{a\text{-}n}$ and underlying funds $120_{a\text{-}n}$, $122_{a\text{-}n}$, $124_{a\text{-}n}$ for objective, predetermined events. The offering materials for investment vehicle 100 may list what constitutes an objective, predetermined event. The list of objective, predetermined events may include, for example, fraud, bankruptcy, litigation, loss of a predetermined percentage of net asset value, and/or indictment of managers.

In various embodiments, investment vehicle's 100 term expires shortly before the maturity date of the debt 102. The period of time between the expiration of the term of investment vehicle 100 and the maturity date of the debt 102 is long enough that investment vehicle manager 200 will have sufficient time to liquidate enough of the equity 101 to pay the debt holders 202 the face amount of the debt 102.

At step 350, once the term of investment vehicle 100 expires, debt holders 202 are paid the face amount of the debt 102. In various embodiments, if the value of the assets is less than the face amount of the debt 102, the assets are completely liquidated and debt holders 202 are paid proportionally. In the event that the assets are not worth as much as the face amount of debt 102, debt holders 202 do not have any recourse for the difference. Similarly, equity holders 201 have no recourse for the complete loss of their investment.

At step 360, if the value of the assets exceeds the face amount of debt 102, then equity holders 201 may elect whether or not to continue the operations of investment vehicle 100. Continuing operations may entail managing the remaining assets or issuing new debt 102 and initiating a new term for investment vehicle 100.

At step 370, if equity holders 201 elect to discontinue operations, then the remaining assets are distributed to equity holders 201. In various embodiments, the remaining assets may be distributed to equity holders 201 by liquidating the remaining equity 101 and paying equity holders 201 or by transferring ownership of the remaining equity 101 to equity holders 201.

At step 380, if equity holders 201 elect to continue operations, then equity holders 201 may elect whether or not to expand the operations of investment vehicle 100. Expanding the operations of investment vehicle 100 may entail issuing new debt 102 and/or equity 101 and initiating a new term for investment vehicle 100.

At step 390, if equity holders 201 elect not to expand the operations of investment vehicle 100, then the remaining assets are managed on an on-going basis for equity holders 201.

If equity holders 201 elect to expand the operations of investment vehicle 100 at step 380, then process is restarted from either step 310 or step 320 depending on the extent to which equity holders 201 want to expand the operations of investment vehicle 100.

In various embodiments, the structure of investment vehicle 100 allows brokers to hedge option offerings on investment funds $110_{a\text{-}n}$. This allows a broker to effectively hedge against options on the overall assets of the funds. The structure of investment vehicle 100 also allows investors to arbitrage the price of equity 101 and debt 102.

In various embodiments, the net asset value of investment vehicle 100 is calculated, by computer or otherwise, using the net asset values calculated by investment funds $110_{a\text{-}n}$ without verifying the accuracy of the calculations or the data used in the calculations. Periodic or occasional reports may be generated, by computer or otherwise, electronically or in hardcopy, for any of the information in such databases, for the benefit of individual investors, for the investment vehicle 100 managers, or for other parties. In various embodiments, the accuracy of the net asset value calculation received from each investment fund $110_{a\text{-}n}$.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

Embodiments of the invention are intended to comply with any applicable local, state, or federal laws, rules, regulations, or policies that may be related to the practice, use or operation of the invention. For example, such laws, rules, regulations, or policies may govern accounting practices, investment transactions, or securities trading associated with various aspects of the invention.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It can be appreciated that, in certain aspects of the invention, a single step may be replaced by multiple step, and multiple steps may be replaced by a single step, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. For example, the debt 102 may be issued before the equity 101. There may be variations to the diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. A method, using a programmable computer, of managing assets in an investment vehicle, comprising the steps of:
   (a) issuing equity in the investment vehicle to at least one equity holder;
   (b) issuing debt to at least one debt holder using the investment vehicle as collateral, wherein the debt does not require any payments prior to the maturity date of the debt;
   (c) investing, using a programmable computer, at least a portion of the investment vehicle's assets in a static basket of equity interests in one or more investment funds, wherein each of the investment funds allocates its assets among one or more underlying investment funds;
   (d) passively managing the static basket of equity interests for the term of the investment vehicle;
   (e) calculating, using the computer, a net asset value of the investment vehicle, using net asset values of the one or more investment funds;
   (f) generating, using the computer, periodic or occasional reports, regarding the net asset value of the investment vehicle, such reports being hardcopy or electronic; and
   (g) providing access, using the computer, to the reports to individual investors and investment vehicle managers.

2. The method of claim 1, further comprising:
   liquidating the static basket of equity interests at the expiration of the investment vehicle's term;
   paying the debt holders the face value of the debt on the maturity date of the debt; and
   distributing the remaining assets to the equity holders.

3. The method of claim 1, further comprising:
   liquidating the minimum equity interests necessary to pay the debt holders the face value of the debt; and
   paying the debt holders the face value of the debt on the maturity date of the debt.

4. The method of claim 3, further comprising transferring the remaining equity interests to the equity holders.

5. The method of claim 3, further comprising managing the remaining equity interests for the equity holders.

6. The method of claim 3, further comprising repeating steps (a) through (d).

7. The method of claim 3, further comprising repeating steps (b) through (d).

8. The method of claim 3, further comprising repeating steps (a), (c), and (d).

9. The method of claim 3, further comprising repeating steps (c) and (d).

10. The method of claim 1, further comprising issuing all or part of the equity to the investment vehicle.

11. The method of claim 1, wherein the debt is nonrecourse.

12. The method of claim 1, further comprising liquidating the equity interest in one or more of the investment funds prior to the maturity date of the debt upon the occurrence of one or more predetermined, objective events.

13. The method of claim 12, wherein the one or more predetermined, objective events include one or more of: evidence of fraud committed by the investment fund's managers, the filing of bankruptcy by the investment fund, the initiation of litigation involving the risk of the investment fund losing a predetermined percentage of the investment fund's net asset value, loss of a predetermined percentage of the investment fund's net asset value, or the indictment of one or more of the investment fund's managers.

14. The method of claim 1, wherein the investment vehicle is a special purpose, bankruptcy remote entity.

15. The method of claim 1, further comprising selling options written on all or part of the equity.

16. The method of claim 1, further comprising purchasing options written on all or part of the equity.

17. The method of claim 1, further comprising entering into structured transactions based upon or with reference to the equity.

18. The method of claim 1, further comprising offering structured products on and with reference to the equity.

19. The method of claim 1, further comprising calculating the net asset value of the investment vehicle.

20. The method of claim 19, further comprising:
   receiving the calculated net asset value of each of the investment funds from each fund's manager; and
   calculating the net asset value of the investment vehicle based on the received net asset value for each of the investment funds, wherein the accuracy of the received net asset values is not verified.

21. The method of claim 1, wherein the investment funds are one of: all hedge funds, all mutual funds, or a combination thereof.

22. The method of claim 21, wherein the underlying funds are one of: all hedge funds, all mutual funds, or a combination thereof.

23. A method for investing, using a programmable computer, comprising the steps of:
   (a) purchasing equity in an investment vehicle, wherein the investment vehicle issues debt to at least one debt holder secured by the investment vehicle, wherein the debt does not require any payments prior to the maturity date of the debt, wherein the investment vehicle is comprised of a static basket of equity interests in one or more investment funds, wherein each of the investment funds allocates its assets among one or more underlying investment funds, and wherein the static basket of equity interests is passively managed for the term of the investment vehicle;
   (b) calculating, using the computer, a net asset value of the investment vehicle, using net asset values of the one or more investment funds;
   (c) generating, using the computer, periodic or occasional reports, regarding the net asset value of the investment vehicle, such reports being hardcopy or electronic; and
   (d) providing access, using the computer, to the reports to individual investors and investment vehicle managers.

24. The method of claim 23, further comprising accepting a payment after the expiration of the investment vehicle's term, wherein the equity interests in the investment funds were liquidated after the expiration of the investment vehicle's term, and wherein the debt holders were paid the face value of the debt on the maturity date of the debt.

25. The method of claim 23, further comprising accepting the transfer of equity interests in the investment funds, wherein the debt holders were paid the face value of the debt on the maturity date of the debt.

26. The method of claim 23, further comprising extending the term of the investment vehicle following the expiration of the original term of the investment vehicle, wherein the debt holders are paid the face value of the debt on the maturity date of the debt, wherein additional debt is issued to at least one debt holder, and wherein the additional debt is secured with the investment vehicle.

27. The method of claim 23, further comprising transferring the equity, in whole or in part.

28. The method of claim 23, wherein the debt is nonrecourse.

29. The method of claim 23, further comprising liquidating the equity interest in one or more of the investment funds prior to the maturity date of the debt upon the occurrence of one or more predetermined, objective events.

30. The method of claim 29, wherein the one or more predetermined, objective events include one or more of: evidence of fraud committed by the investment funds' managers, the filing of bankruptcy by the investment fund, the initiation of litigation involving the risk of the investment fund losing a predetermined percentage of the investment fund's net asset value, loss of a predetermined percentage of the investment fund's net asset value, or the indictment of one or more of the investment fund's managers.

31. The method of claim 23, wherein the investment vehicle is a special purpose, bankruptcy remote entity.

32. The method of claim 23, further comprising purchasing options written on all or part of the equity.

33. The method of claim 23, further comprising selling options written on all or part of the equity.

34. The method of claim 23, further comprising entering into structured transactions based upon or with reference to the equity.

35. The method of claim 23, further comprising offering structured products on and with reference to the equity.

36. The method of claim 23, further comprising receiving the calculated net asset value of the investment vehicle.

37. The method of claim 36, wherein the calculated net asset value was calculated using the net asset value of each of the investment funds as calculated by each fund's manager, and wherein the accuracy of the calculated net asset value was not verified.

38. The method of claim 23, wherein the investment funds are one of: all hedge funds, all mutual funds, or a combination thereof.

39. The method of claim 38, wherein the underlying funds are one of: all hedge funds, all mutual funds, or a combination thereof.

40. A method for lending capital, using a programmable computer, comprising the steps of:
   (a) purchasing debt, wherein no payments are due until the maturity date of the debt, wherein the debt is secured by an investment vehicle comprised of a static basket of equity interests in one or more investment funds, wherein each of the investment funds allocates its assets among one or more underlying investment funds, and wherein the static basket of equity interests is passively managed for the term of the investment vehicle;
   (b) calculating, using the computer, a net asset value of the investment vehicle, using net asset values of the one or more investment funds;
   (c) generating, using the computer, periodic or occasional reports, regarding the net asset value of the investment vehicle, such reports being hardcopy or electronic; and
   (d) providing access, using the computer, to the reports to individual investors and investment vehicle manager.

41. The method of claim 40, further comprising:
   accepting a payment from the investment vehicle for the face value of the debt on the maturity date of the debt.

42. The method of claim 40, wherein the debt securities are nonrecourse.

43. A method of facilitating the creation of an investment vehicle, using a programmable computer, comprising the steps of:
   (a) issuing equity in the investment vehicle to at least one equity holder;
   (b) issuing debt to at least one debt holder using the investment vehicle as collateral, wherein the debt does not require any payments prior to the maturity date of the debt;
   (c) facilitating investment, using a programmable computer, of at least a portion of the investment vehicle's assets in a static basket of equity interests in one or more investment funds, wherein each of the investment funds allocates its assets among one or more underlying investment funds, wherein the basket of equity interests will remain static and be passively managed for the term of the investment vehicle;
   (d) calculating, using the computer, a net asset value of the investment vehicle, using net asset values of the one or more investment funds;
   (e) generating, using the computer, periodic or occasional reports, regarding the net asset value of the investment vehicle, such reports being hardcopy or electronic; and
   (f) providing access, using the computer, to the reports to individual investors and investment vehicle managers.

44. A programmable computer system for managing an investment vehicle, the system comprising:
   a processor; and
   one or more data storage devices, operatively associated with the processor;

wherein the processor is configured to execute the steps comprising:

(a) identifying a static basket of equity interests in one or more investment funds, wherein the equity interests are passively managed for the term of the investment vehicle, wherein each of the one or more investment funds allocates its assets among one or more underlying investment funds, wherein debt secured by the investment vehicle is issued, wherein no payments are due on the debt until the maturity date, and wherein equity in the investment vehicle is issued;

(b) calculating, using the computer, a net asset value of the investment vehicle, using net asset values of the one or more investment funds;

(c) generating, using the computer, periodic or occasional reports, regarding the net asset value of the investment vehicle, such reports being hardcopy or electronic; and (d) providing access, using the computer, to the reports to individual investors and investment vehicle managers.

45. The system of claim 44, wherein the debt is nonrecourse.

46. The system of claim 44, wherein the passive management comprises the steps of:

maintaining the static basket of equity interests for the term of the investment vehicle unless a predetermined, objective event occurs; and liquidating the equity interest in investment fund which experienced the predetermined, objective event.

47. The system of claim 46, wherein the one or more predetermined, objective events include one or more of: evidence of fraud committed by the investment funds' managers, the filing of bankruptcy by the investment fund, the initiation of litigation involving the risk of the investment fund losing a predetermined percentage of the investment fund's net asset value, loss of a predetermined percentage of the investment fund's net asset value, and/or the indictment of one or more of the investment fund's managers.

48. The system of claim 44, wherein the issuer is a special purpose, bankruptcy remote entity.

49. The system of claim 44, further comprising options written on all or part of the equity.

50. The system of claim 44, further comprising structured products on and with reference to the equity.

51. The system of claim 44, wherein the net asset value of the investment vehicle is calculated.

52. The system of claim 51, further comprising receiving the calculated net asset value of each of the one or more investment funds from that fund's managers, wherein the net asset value of the investment vehicle is calculated based on the received net asset values, and wherein the accuracy of the received net asset values is not verified.

53. The system of claim 44, wherein the one or more investment funds are one of: all hedge funds, all mutual funds, or a combination thereof.

54. The system of claim 53, wherein the one or more underlying funds are one of: all hedge funds, all mutual funds, or a combination thereof.

55. A programmable computer system to manage assets in an investment vehicle, the system comprising:

a processor; and one or more data storage devices, operatively associated with the processor;

wherein the processor is configured to execute the steps comprising:

(a) issuing equity in the investment vehicle to at least one equity holder;

(b) issuing debt to at least one debt holder using the investment vehicle as collateral, wherein the debt does not require any payments prior to the maturity date of the debt;

(c) investing, using the computer, at least a portion of the investment vehicle's assets in a static basket of equity interests in one or more investment funds, wherein each of the investment funds allocates its assets among one or more underlying investment funds;

(d) passively managing the static basket of equity interests for the term of the investment vehicle;

(e) calculating, using the computer, a net asset value of the investment vehicle, using net asset values of the one or more investment funds;

(f) generating, using the computer, periodic or occasional reports, regarding the net asset value of the investment vehicle, such reports being hardcopy or electronic; and (g) providing access, using the computer, to the reports to individual investors and investment vehicle managers.

56. A programmable computer system for investing, the system comprising:

a processor; and one or more data storage devices, operatively associated with the processor;

wherein the processor is configured to execute the steps comprising:

(a) purchasing equity in an investment vehicle, wherein the investment vehicle issues debt to at least one debt holder secured by the investment vehicle, wherein the debt does not require any payments prior to the maturity date of the debt, wherein the investment vehicle is comprised of a static basket of equity interests in one or more investment funds, wherein each of the investment funds allocates its assets among one or more underlying investment funds, and wherein the static basket of equity interests is passively managed for the term of the investment vehicle;

(b) calculating, using the computer, a net asset value of the investment vehicle, using net asset values of the one or more investment funds;

(c) generating, using the computer, periodic or occasional reports, regarding the net asset value of the investment vehicle, such reports being hardcopy or electronic; and (d) providing access, using the computer, to the reports to individual investors and investment vehicle managers.

57. A programmable computer system for lending capital, the system comprising:

a processor; and one or more data storage devices, operatively associated with the processor;

wherein the processor is configured to execute the steps comprising:

(a) purchasing debt, wherein no payments are due until the maturity date of the debt, wherein the debt is secured by an investment vehicle comprised of a static basket of equity interests in one or more investment funds, wherein each of the investment funds allocates its assets among one or more underlying investment funds, and wherein the static basket of equity interests is passively managed for the term of the investment vehicle;

(b) calculating, using the computer, a net asset value of the investment vehicle, using net asset values of the one or more investment funds;

(c) generating, using the computer, periodic or occasional reports, regarding the net asset value of the investment vehicle, such reports being hardcopy or electronic; and (d) providing access, using the computer, to the reports to individual investors and investment vehicle manager.

58. A programmable computer system for facilitating the creation of an investment vehicle, the system comprising:
a processor; and
one or more data storage devices, operatively associated with the processor;
wherein the processor is configured to execute the steps comprising:
(a) issuing equity in the investment vehicle to at least one equity holder;
(b) issuing debt to at least one debt holder using the investment vehicle as collateral, wherein the debt does not require any payments prior to the maturity date of the debt;
(c) facilitating investment, using the computer, of at least a portion of the investment vehicle's assets in a static basket of equity interests in one or more investment funds, wherein each of the investment funds allocates its assets among one or more underlying investment funds, wherein the basket of equity interests will remain static and be passively managed for the term of the investment vehicle;
(d) calculating, using the computer, a net asset value of the investment vehicle, using net asset values of the one or more investment funds;
(e) generating, using the computer, periodic or occasional reports, regarding the net asset value of the investment vehicle, such reports being hardcopy or electronic; and
(f) providing access, using the computer, to the reports to individual investors and investment vehicle managers.

* * * * *